Patented Mar. 16, 1948

2,437,859

UNITED STATES PATENT OFFICE 2,437,859

PROCESS OF PREPARING FRESH GREEN VEGETABLES

Orville Lee Moulthrop, Selma, Calif., assignor to Western Frozen Foods Co., Fresno, Calif., a corporation of California No Drawing. Application June 25, 1945, Serial No. 601,544

6 Claims. (Cl. 99—154)

This invention pertains to an improved process of preparing fresh green vegetables for canning and freezing, so that such vegetables may be packaged, quickly frozen and then maintained in a state which allows them to be shipped and stored for appreciable periods of time before they are used.

The quick freezing of vegetables is well known. One of the disturbing factors which have limited the use and sale of frozen vegetables is the fact that upon thawing, the vegetables lack the brilliance and sparkle of the characteristic green color of a fresh unfrozen vegetable. Ordinarily, after a frozen vegetable is thawed, it is grayish in tone and the green lacks the depth and brilliance of a fresh vegetable. Instead, the thawed vegetable is a dirty gray-green in color.

The method described hereafter permits very large quantities of vegetables to be rapidly and properly treated prior to freezing and results in a setting or fixation of the original deep brilliance and characteristic green color of the fresh vegetable.

Generally stated, the method of the present invention contemplates a process in which the vegetables are washed, subjected to the action of a concentrated salt solution and then blanched. Conditions of temperature, time, salt concentration, etc., are of importance in the rapid handling of vegetables in accordance with this process on a commercial scale and the description given hereinafter provides these necessary conditions and instructions.

An object of the invention, therefore, is to disclose and provide a process of preparing fresh green vegetables for freezing whereby the natural, inherent, green coloration is fixed or set so that after freezing and upon subsequent thawing, the fruit or vegetable retains its natural deep green color.

A further object of the invention is to disclose and provide a process whereby large quantities of vegetables may be rapidly and practically continuously prepared for subsequent freezing, the process setting or fixing the natural color of the vegetables and stopping oxidation, enzymatic action, spoilage and the like.

These and other objects of the invention will become apparent to those skilled in the art from the following description in which exemplary conditions of time, temperature, concentration, etc., are set forth.

Although the process is capable of being used on various vegetables, it is particularly directed to fresh green vegetables such as string beans, Brussels sprouts, broccoli, peas, asparagus, spinach, vined lima beans, etc.

The process may be carried out in various forms of apparatus but the use of a long conveyor belt made from wire netting or other foraminous material, such as wire mesh, has been found extremely satisfactory. Such conveyor belt may move at a predetermined speed and a series of different operations may be carried out upon the vegetables supported and moved by the conveyor. In the performance of the process, the vegetables to be treated are placed upon one end of the belt as soon as possible after such vegetables are picked or cut. Preferably such vegetables first are subjected to a washing operation with clear water. It has been found desirable to jet the water upon the vegetables, thereby utilizing the forcible action of the jets in the removal of adherent dirt and foreign matter. Water at a temperature of between about 90° F. and 110° F. is preferably used, water within this temperature range apparently facilitating and expediting the subsequent operations. When a temperature of about 110° F. is used at this stage, the washing period consumes about 25 to 35 seconds. This time may also include a short period of travel of vegetables through a zone in which draining is permitted to take place.

The belt then moves the vegetables beneath a series of nozzles supplied with an aqueous salt solution. A rather concentrated salt solution is preferably employed, that is, the aqueous solution may contain from about 20% to as high as 30% of salt (NaCl) by weight when the concentration is determined at say 60° F. Although this aqueous salt solution may be used at atmospheric temperatures of say 60° F. or 70° F., it is desirable to use the solution at temperatures of between about 100° F. and 130° F. since a shorter treating time will suffice when the salt spray is at these more elevated temperatures. In actual practice, a time of about 40 to 42 seconds is sufficient when the salt solution is at 120° F.; 25 seconds is sufficient when the salt solution is at 130° F.; as long as 60 seconds may be required when the solution is at about 100° F.

It is to be understood that since the vegetables are carried upon a foraminous belt or carrier, the salt solution drains quickly. Wire baskets or other means may be used. The vegetables should not be permitted to stand submerged in a concentrated salt solution for any appreciable length of time. The salt solution spray should impinge the vegetables in a rather forcible manner and act as a forcible rinse. Fish-tail nozzles have been found satisfactory.

By employing the concentrations, temperatures and times described hereinabove for the salt solution spray operation, the coloring is fixed or set and in many instances appears to deepen. It may also be noted that salt solutions of higher concentrations appear to produce better results on tougher vegetables whereas solutions having a concentration within the lower portion of the range indicated are preferably used on tender vegetables. The same species of vegetable may be quite tender during one portion of the season and tough during another portion of the season. Vegetables from different areas or those raised under different climatic or soil conditions may also vary in tenderness, so that the operator should take these variables into consideration in selecting the optimum temperature time and salt content conditions for the performance of this step of the process.

The conveyor belt may then pass through an inspection zone in which damaged or unsatisfactory vegetables are removed. Simultaneously, any excess solution drains away from the vegetables during this period of travel. Thereafter the vegetables pass into a blanching zone in which they are blanched and rapidly cooled. Blanching operations are well known and are designed to prevent spoilage by inhibiting oxidation and stopping enzymatic action. In the performance of the present process it has been found highly desirable to blanch the vegetables by subjecting them to the action of steam so as to raise the temperature of the vegetables to about 190°–210° F. within a period of less than 5 minutes. A longer period of time appears to exert partial cooking action. Blanching at about 210° F. may be accomplished in from about 3 minutes to 3 minutes and 20 seconds, steam being introduced into the enclosure through which the belt is traveling both from points above the belt and points below the belt, so that the vegetables rapidly reach the desired blanching temperature. The blanched vegetables immediately pass into a cooling zone in which they are sprayed with chilled water. Quick cooling is highly desirable so as to prevent slow cooking by reason of internal heat. By spraying the vegetables with water at a temperature of about 40° F., the cooling is rapidly attained and the vegetables are discharged at a temperature of about 58° F. or 60° F.

Vegetables thus treated then go to packing tables, are packed in suitable cartons or boxes, and are then frozen.

The aqueous salt solution used for setting or fixing the color and for deepening the color may be recirculated and reused. If the vegetables have been thoroughly washed before being subjected to the action of the aqueous salt solution, the solution need not be clarified or filtered very often. In some instances the preliminary washing operation may be dispensed with altogether but in that case the salt solution needs be filtered or otherwise clarified before being reused and in most instances a longer treating time is necessary. It appears that the preliminary step of subjecting the fresh green vegetables to the action of a forcible spray of water at 90–110° F. opens the pores or surface cells sufficiently to render the subsequent spraying with aqueous salt solution much more effective and rapid.

It will be evident to those skilled in the art that the process described hereinabove is extremely simple and is capable of being used in handling tremendous quantities of vegetables in an efficient and economical manner. The color of frozen vegetables which have been pretreated in accordance with this process is markedly and surprisingly better than other forms of pretreatment known heretofore.

I claim:

1. In a process of preparing fresh green vegetables for freezing, the steps of: subjecting fresh green vegetables to the action of a forcible spray of an aqueous salt solution at a temperature of between about 100° F. and 130° F. for a period of from about 25 seconds to 60 seconds, said solution having a sodium chloride content of between about 20% and 30% by weight at 60° F., while permitting excess solution to drain from the vegetables, and then subjecting the wet vegetables to the action of steam to raise the temperature thereof to about 190° F.–210° F. within a period of less than 5 minutes, and then rapidly cooling the vegetables to inhibit cooking of the vegetables.

2. A process of preparing fresh green vegetables for freezing comprising: washing fresh green vegetables with water at a temperature of between about 90° F. and 110° F., then subjecting the washed vegetables to the action of a forcible spray of an aqueous solution having a content of between about 20% and 30% of sodium chloride at 60° F. for a period of from about 25 seconds to 60 seconds, while permitting excess solution to drain therefrom, and then blanching and rapidly cooling the vegetables.

3. A process of preparing fresh green vegetables for freezing comprising: washing fresh green vegetables with water at a temperature of between about 90° F. and 110° F., then subjecting the washed vegetables to the action of a forcible spray of an aqueous solution having a content of between about 20% and 30% of sodium chloride at 60° F. for a period of from about 25 seconds to 60 seconds, while permitting excess solution to drain therefrom, then blanching the vegetables by subjecting them to the action of steam to raise the temperature thereof to about 190° F.–210° F. within a period of 2 to 4 minutes, and then rapidly cooling the blanched vegetables by means of a cold water spray.

4. In a process of preparing fresh green vegetables for freezing, the step of: subjecting fresh green vegetables, prior to blanching to the action of a forcible spray of an aqueous salt solution at a temperature of between about 100° F. and 130° F. for a period of from about 25 seconds to 60 seconds, said solution having a sodium chloride content of between about 20% and 30% by weight at 60° F., while permitting excess solution to drain from the vegetables.

5. In a process of preparing fresh green vegetables for freezing, the steps of: washing fresh green vegetables with clear water, and then subjecting the washed vegetables to the action of a spray of aqueous solution containing between about 20% and 30% by weight of sodium chloride (at 60° F.), while permitting excess solution to drain from the vegetables, for a length of time sufficient to set the color of the vegetables and retard the development of a grayish, lack-luster appearance in the vegetables upon subsequent freezing and thawing.

6. In a process of preparing fresh green vegetables for freezing, the steps of: washing fresh green vegetables with clear water at a temperature of between about 90° F. and 110° F., and then subjecting the washed vegetables to the action of a spray of aqueous solution containing between about 20% and 30% by weight of sodium chloride (at 60° F.), while permitting excess solution to drain from the vegetables, for a length of time sufficient to set the color of the vegetables and retard the development of a grayish, lackluster appearance in the vegetables upon subsequent freezing and thawing.

ORVILLE LEE MOULTHROP.

REFERENCES CITED

The following references are of record in the file of this patent:

Tressler et al., Freezing Preservation of Foods, Avi. Pub. Co., 1943, N. Y. C., pp. 380–381.